United States Patent
Horgan et al.

(10) Patent No.: US 10,681,036 B2
(45) Date of Patent: Jun. 9, 2020

(54) COMPOSITE SECURITY INTERCONNECT DEVICE AND METHODS

(71) Applicants: Kevin Horgan, Dundee (GB); Gordon Chisholm, Perth (GB); Graeme Mitchell, Dundee (GB); Alexander William Whytock, Perthshire (GB); David Sleeman, Dundee (GB); Colin Sinclair, Angus (GB)

(72) Inventors: Kevin Horgan, Dundee (GB); Gordon Chisholm, Perth (GB); Graeme Mitchell, Dundee (GB); Alexander William Whytock, Perthshire (GB); David Sleeman, Dundee (GB); Colin Sinclair, Angus (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/228,796

(22) Filed: Mar. 28, 2014

(65) Prior Publication Data

US 2016/0359836 A1    Dec. 8, 2016

(51) Int. Cl.
*H04L 29/06* (2006.01)
*G07F 19/00* (2006.01)
*G06Q 20/18* (2012.01)

(52) U.S. Cl.
CPC .......... *H04L 63/083* (2013.01); *G06Q 20/18* (2013.01); *G07F 19/20* (2013.01); *H04L 63/0464* (2013.01); *H04L 63/061* (2013.01); *H04L 63/0823* (2013.01)

(58) Field of Classification Search
CPC ........ G06F 21/83; G07F 19/20; G07F 19/205; G07F 19/207; G07F 7/10
See application file for complete search history.

(56) References Cited

U.S. PATENT DOCUMENTS

| | | | | |
|---|---|---|---|---|
| 5,022,076 A | * | 6/1991 | Rosenow | G06F 11/0757 380/2 |
| 5,175,766 A | * | 12/1992 | Hamilton | G06F 21/6245 705/64 |
| 6,606,387 B1 | * | 8/2003 | Abraham | G06Q 20/3825 380/277 |
| 8,608,057 B1 | * | 12/2013 | Crews | G06F 21/57 235/379 |
| 2005/0160050 A1 | * | 7/2005 | Payne | G06Q 20/382 705/64 |
| 2006/0020788 A1 | * | 1/2006 | Han | G07F 9/026 713/165 |

(Continued)

*Primary Examiner* — Joseph P Hirl
*Assistant Examiner* — Sayed Aresh Beheshti Shirazi
(74) *Attorney, Agent, or Firm* — Schwegman, Lundberg & Woessner (57) ABSTRACT

Various embodiments include composite security interconnect devices and methods. One method embodiment that may be performed by a composite security interconnect device, also referred to herein as a security controller, includes decrypting a first encrypted input received from a peripheral device with a first encryption key to obtain clear text. The first encryption key may be an encryption key established between the security controller and the peripheral device. The method further includes encrypting the clear text with a second encryption key to obtain second encrypted input, the second encryption key being a key of an encryption key pair established with a transaction processing host.

20 Claims, 7 Drawing Sheets

(56) References Cited

U.S. PATENT DOCUMENTS

2007/0204173 A1\* 8/2007 Kuhn .................. G06F 21/83
 713/194
2014/0166744 A1\* 6/2014 Crews .................. G06F 21/57
 235/379

\* cited by examiner

COMPOSITE SECURITY INTERCONNECT DEVICE AND METHODS

BACKGROUND INFORMATION

Increasingly consumers are conducting financial transactions through Self-Service Terminals (SSTs) without the assistance of a teller or clerk. In fact, in many cases these transactions are conducted without any individual, other than a consumer, in the vicinity of the SSTs; other than, perhaps, a security camera integrated into the SSTs or in proximity to the SSTs.

The most common SST transaction occurs by a customer at an Automated Teller Machine (ATM). Contrary to what the general public believes, ATMs can be compromised. To prevent exploitation of SSTs, end-to-end encryption is utilized between SST peripheral input and output devices (i.e., personal identification number (PIN) input devices, touch screens, cash dispensers, etc.) and a transaction processing host, or more simply a host. For this end-to-end encryption to be functional, public/private encryption key pairs are exchanged between each peripheral device and the host. As each SST typically has a plurality of peripheral devices and there may be hundreds of thousands and perhaps even millions of SSTs, a host may have many million encryption keys to establish, manage, and keep secure. Additionally, two devices may replicate certain functionality. For example, with the addition of touch screens to SSTs, a customer PIN may be input via one of two peripheral devices each having their own encryption keys. As a result, the host has a further data processing and step when processing transactions form such SSTs as the proper encryption key for decrypting a PIN number needs to be determined based on the PIN input device used rather than just simply retrieved based on an identifier of the SST.

SUMMARY

Various embodiments include composite security interconnect devices and methods.

One method embodiment that may be performed by a composite security interconnect device, also referred to herein as a security controller, includes decrypting a first encrypted input received from a peripheral device with a first encryption key to obtain clear text. The first encryption key may be an encryption key established between the security controller and the peripheral device. The method further includes encrypting the clear text with a second encryption key to obtain second encrypted input, the second encryption key being a key of an encryption key pair established with a transaction processing host.

DETAILED DESCRIPTION

Various embodiments include composite security interconnect devices, also referred to as security controllers, and methods. In some embodiments, a security controller is connected to a Self-Service Terminal (SST) computer that provides user interaction and transaction processing functionality on an SST. Peripheral devices of the SST that exchange data with the SST in an encrypted manner, such as one or more of a Personal Identification Number (PIN) pad, touch screen, cash dispenser, receipt printer, keyboard, audio input devices, and the like are coupled to the security controller are coupled to the security controller. Encryption keys of these peripheral devices are established between each peripheral device and the security controller. The security controller has a single encryption key, which may be an asynchronous encryption key pair, established between the security controller and a transaction processing host that processes transactions originating on the SST, such as an Automated Teller Machine (ATM), self-service point of sale terminal, and the like. The transaction processing host is simply referred to as a host herein.

In operation, the computer of a SST may request a PIN input from a customer. The PIN may be received as input into one of an encrypted PIN pad and encrypting touch screen peripheral. The peripheral device receiving the PIN input then encrypts the PIN input using an encryption key established between the respective peripheral device and the security controller and transmits the encrypted PIN to the security controller. The security controller, upon receipt of the encrypted PIN, identifies an appropriate encryption key to decrypt the encrypted PIN to obtain the PIN in clear text. The security controller than encrypts the clear text PIN with the encryption key established between the security controller and the host and provides the encrypted PIN to a process executing on the SST computer that requested the PIN input or another process that executes on the SST computer designated to receive the encrypted PIN. The SST computer process receiving the PIN then transmits the encrypted PIN to the host at an appropriate time, such as at a time when data of a withdrawal or purchase amount have also been received.

Similarly, a communication from the host may be received from the host that includes encrypted data for a peripheral device of the SST. For example, a process executing on the SST computer may receive an encrypted dispense command from the host that is addressed to a cash dispenser coupled to the security controller. In such scenarios, the process executing on the SST computer will forward the encrypted dispense command to the security controller. The security controller decrypts the encrypted dispense command using the encryption key established between the security controller and the host to obtain clear text of the dispense command. The security controller then re-encrypts dispense command utilizing an encryption key established between the security controller and the cash dispenser and forwards the encrypted dispense command to the cash dispenser. The cash dispenser then decrypts the encrypted dispense command utilizing the key established between the security controller and the cash dispenser. The cash dispenser then processes the dispense command, such as by dispensing an amount of cash specified in data of the dispense command.

Through such embodiments, a number of encryption keys that are established between a SST and a host are reduced.

This can reduce burdens of the host in establishing, managing, and securing a plurality of encryption keys with each SST. Further, burdens in configuring an SST with a host are reduced as only a single key between the security controller of the SST and the host need be established. By reducing such burdens, administrator and technician time in servicing and maintaining SSTs and host systems may be reduced.

At the same time, various devices of an SST, including peripheral devices coupled to a security controller may include functionality to report faults, errors, incidence of tampering, status, and other such information to an SST device manager. An SST device manager is a system or entity that provides servicing of SSTs. Reporting of such data informs the SST device manager of status and servicing needs of the SSTs. Previously, peripheral devices reported such data to one or more platform services of the SST computer that then relays such status data to the device manager, either through the host or directly to the device manager. The security in controller in various embodiments includes functionality to receive such status data from peripheral devices connected thereto and relay the status data the appropriate one or more platform services of the SST computer.

These and other embodiments are described in further detail, with reference to the figures, herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on or coupled to a system, such as a computer or other device capable of processing data.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
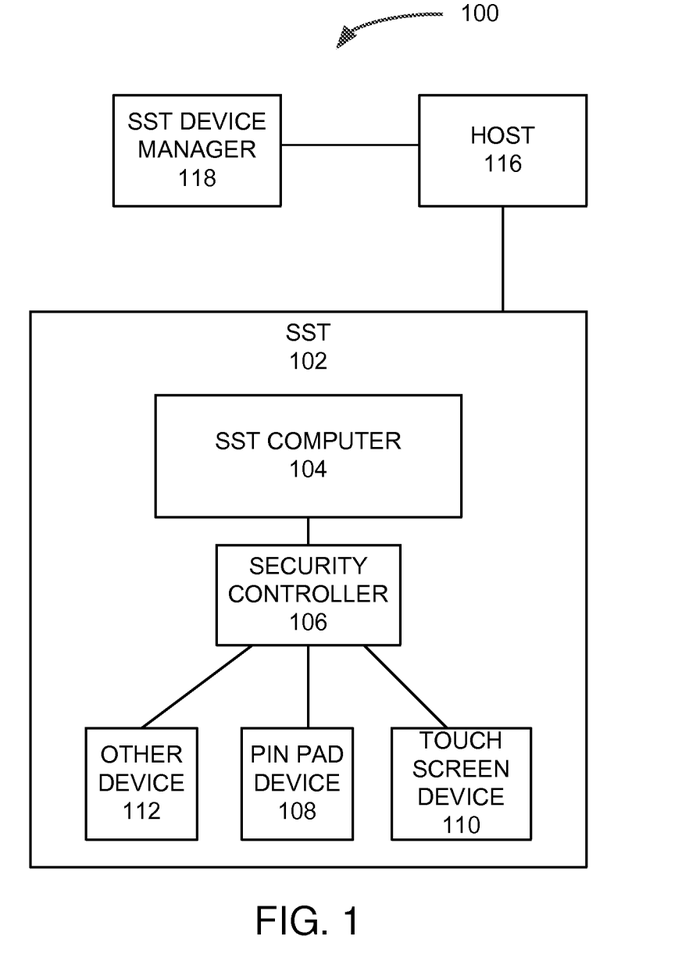
FIG. 1 is a logical block diagram of a system architecture, according to an example embodiment.

FIG. 1 is a logical block diagram of a system 100 architecture, according to an example embodiment. The system 100 includes an SST 102, a host 116, and an SST device manager 118. In various embodiments, the SST 102 may be an ATM, a self-checkout point of sale terminal, a pay-at-the-pump terminal coupled to a fuel pump, a vending machine point-of-sale terminal, and other such SSTs.

The SST 102 is connected via a network to the host 116. The network connecting the SST 102 to the host 116 is a network capable of carrying data between the SST 102 and the host 116. Depending on the type of SST 102 of the particular embodiment, the data network may be in accord with one or more of statutory, regulatory, industry standard, network operator, and other policies and requirements.

The SST 102 is also connected via a network to the SST device manager 118. However, the network between the SST 102 and the SST device manager 118, in some embodiments, is indirect via the network connection to the host 116. In one such embodiment, an entity operating the host 116 is the same entity operating the SST device manager 118. Thus, when data is provided to the host 116, the data may also be provided to the SST device manager 118 or forwarded by a host 116 process, which is generally provided as one or more platform services of the SST computer 104, to the SST device manager 118. In other embodiments, a connection to the SST device manager 118 may be made via a distinct network (not illustrated). The distinct network may be the Internet or other network. For example, such a distinct network may be utilized to connect the SST 102 to the SST device manager 118 in embodiments where there are no statutory, regulatory, or industry standards governing security of data communicated there between.

The SST 102, in the example embodiment of the system 100, includes an SST computer 104, a security controller 106 coupled to the SST computer 104, and one or more peripheral devices connected to the security controller 106, such as PIN pad device 108, touch screen device 110, and one or more other devices 112. The other device 112 may be a cash dispenser, a receipt printer, a keyboard, an audio output device, an audio input device, a card reader, and other input and output devices.

The peripheral devices include at least one of an input or output mechanism. The peripheral devices further include an encryption key store, such as a memory device, and a processor, ASIC, or other circuit to perform one or both of encryption and decryption operations. The encryption and decryption actions are performed on data received as input or data received to be output or to command the respective peripheral device to perform an action, such as dispense currency, output a sound, or other action. Data received by a peripheral device as input is encrypted with an encryption key established between the respective peripheral device and the security controller 106 and is transmitted to the security controller 106. Data received by a peripheral device for output is received in an encrypted form from the security controller 106 and is decrypted according to the encryption key stored in the memory and processed by the peripheral device for output or to trigger performance of an output action.

Figure 2:
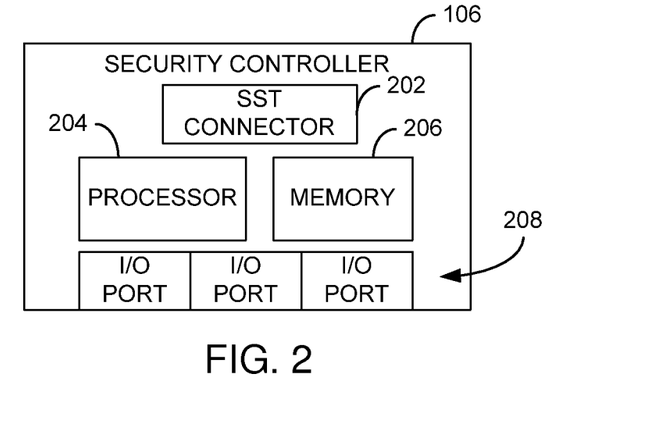
FIG. 2 is a logical block diagram of a security controller, according to an example embodiment.

Further detail of the security controller 106 is illustrated in FIG. 2. FIG. 2 is a logical block diagram of a security controller, according to an example embodiment. The security controller 106 may take the form of an integrated circuit board, an enclosed device, or other form factor. However, in some embodiments the security controller 106 may instead be integrated within a motherboard of the SST computer 104, within a housing of a peripheral device such as a touch screen or PIN pad, or integrated with an integrated circuit board of such a peripheral device.

In some embodiments, the security controller 106 includes an SST connector 202, such as a Universal Serial Bus (USB) connector, a set of connector pins that plug into a dedicated or universal peripheral device slot on a motherboard of the SST computer 104, serial connector, or other connector to enable the security controller 106 to communicate data with the SST computer 104.

The security controller 106 also includes a processor 204 and a memory 206. The processor 204 may be a general-purpose data processing unit, one or more integrated circuits dedicated to specific tasks such as encryption, an ASIC, or other device capable of performing data processing tasks including at least one of encryption and decryption tasks depending on the particular embodiment.

The security controller 106 includes a memory 206. The memory 206 may be a volatile or non-volatile memory. For example, the memory 206 may be random access memory, flash memory, write-once memory, or of another memory type. The memory 206 may also be more than one memory device where each memory device may be of the same type of memory or varied memory types.

The memory 206 stores instructions executable by the processor 204 to perform encryption and decryption functions utilizing encryption keys also stored in the memory 206. The encryption keys may be stored in one memory device of the memory 206 and the instructions stored in a different memory device of the memory 206. In some such embodiments, the encryption keys may be stored in a memory designated or manufactured as a secure encryption key store, such as a Trusted Platform Module (TPM), an encrypted memory device, a volatile memory device, and the like. In some embodiments where encryption keys are stored in a volatile memory, the memory 206 or the security controller 106 includes a battery (not illustrated) that provides power to the memory 206 to preserve, for at least a limited duration, the stored encryption keys when an SST within which the security controller is cycled, reset, or other otherwise loses power.

The memory 206, in some embodiments, also stores instructions to receive and process device management messages received via I/O ports 208 from peripheral devices connected thereto. Device management messages may include data representative of one or more of peripheral device faults, errors, incidence of tampering, status, and other such information. The data of these messages is intended for reporting to the SST device manager 118 of FIG. 1. Device management messages may be received in clear or cypher text. When received in cypher text, the messages are first decrypted utilizing an appropriate encryption key identified in the memory 206 based on the peripheral device from which the device management message was received.

The memory 206 may also store instructions to generate device management instructions with regard to a status, detected events such as device tampering, loss of communication with a peripheral device, and other conditions with regard to the security controller 106. As such, the instructions stored in the memory 206 in such embodiments include further instructions for detecting events to trigger generation of device management messages.

Regardless of whether device management messages are generated on or received by the security controller 106, device management messages are processed according to the instructions stored in the memory 206 to pass the data of the device management message to a platform service of the SST computer 104 of FIG. 1. The platform service handles further processing and communication of the device management message to the SST device manager 118.

In a further embodiment, the security controller 106 includes instructions stored in the memory 206 that are executable by the processor 204 to handle a security controller 106 tampering event. The instructions may be triggered by detecting a data condition within the security controller 106 or upon receipt of input from one or more tamper detection devices present in the security controller 106. The instructions, when triggered, may cause all, or certain, encryption keys stored in the memory 206 of the security controller to be erased. The instructions may further attempt to generate and transmit a device management message including data indicating the detected tampering event.

The security controller 106 also includes at least one Input/Output (I/O) port 208. In some embodiments, the security controller 106 includes two I/O ports 208. In further embodiments, the security controller 106 includes three or more I/O ports 208. The I/O ports 208 may be USB ports, serial ports, proprietary device and data interconnection ports, and other port-types. In some embodiments that include more than one I/O port 208, the I/O ports 208 may be of varied types, e.g., USB and serial ports. In other embodiments including a plurality of I/O ports 208, the I/O ports 208 may of all the same type.

Figure 3:
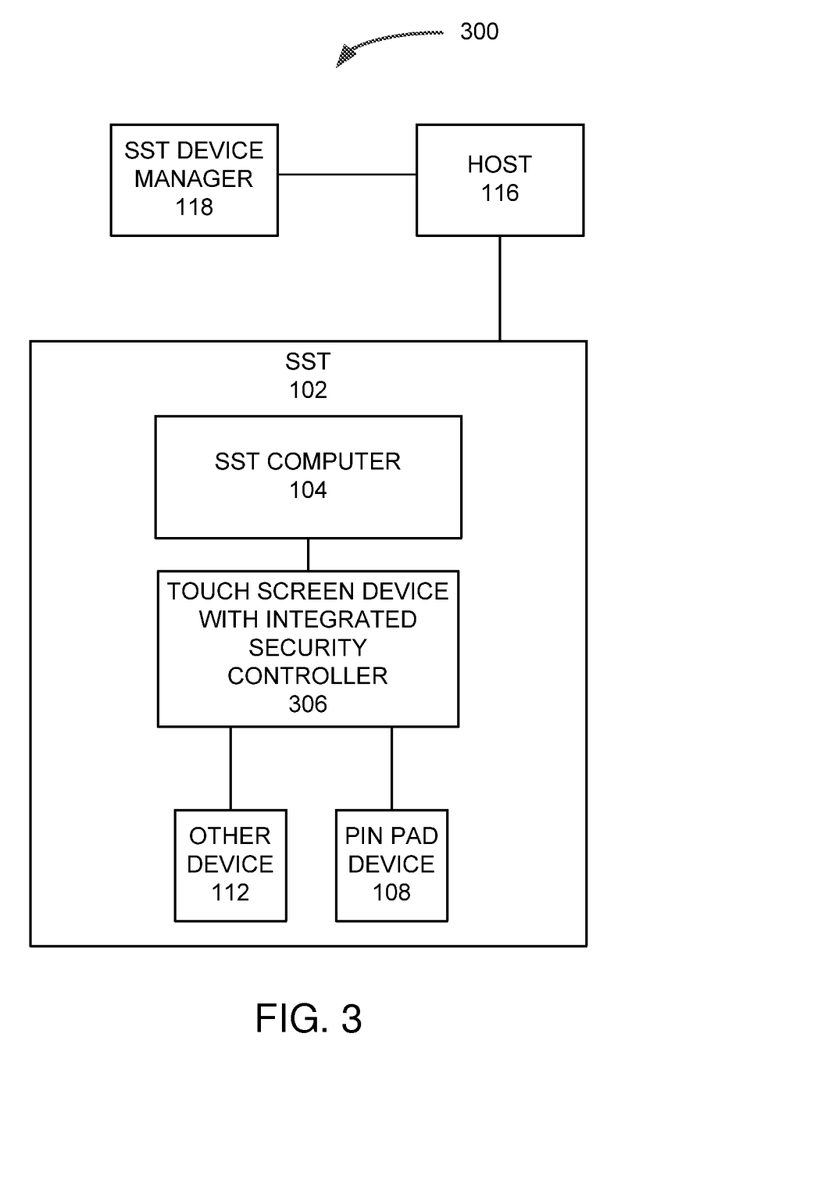
FIG. 3 is a logical block diagram of a system architecture, according to an example embodiment.

FIG. 3 is a logical block diagram of a system 300 architecture, according to an example embodiment. The architecture of the system 300 is very similar to the architecture of the system 100 of FIG. 1. However, the SST 102 of the system 300 includes a touch screen device 306 with the security controller, such as security controller 106 of FIG. 1 and FIG. 2, integrated therein. In such embodiments, the other peripheral devices of the SST 102, such as the PIN pad device 108 and one or more other devices 112, are connected to I/O ports of the touch screen device 306.

Figure 4:
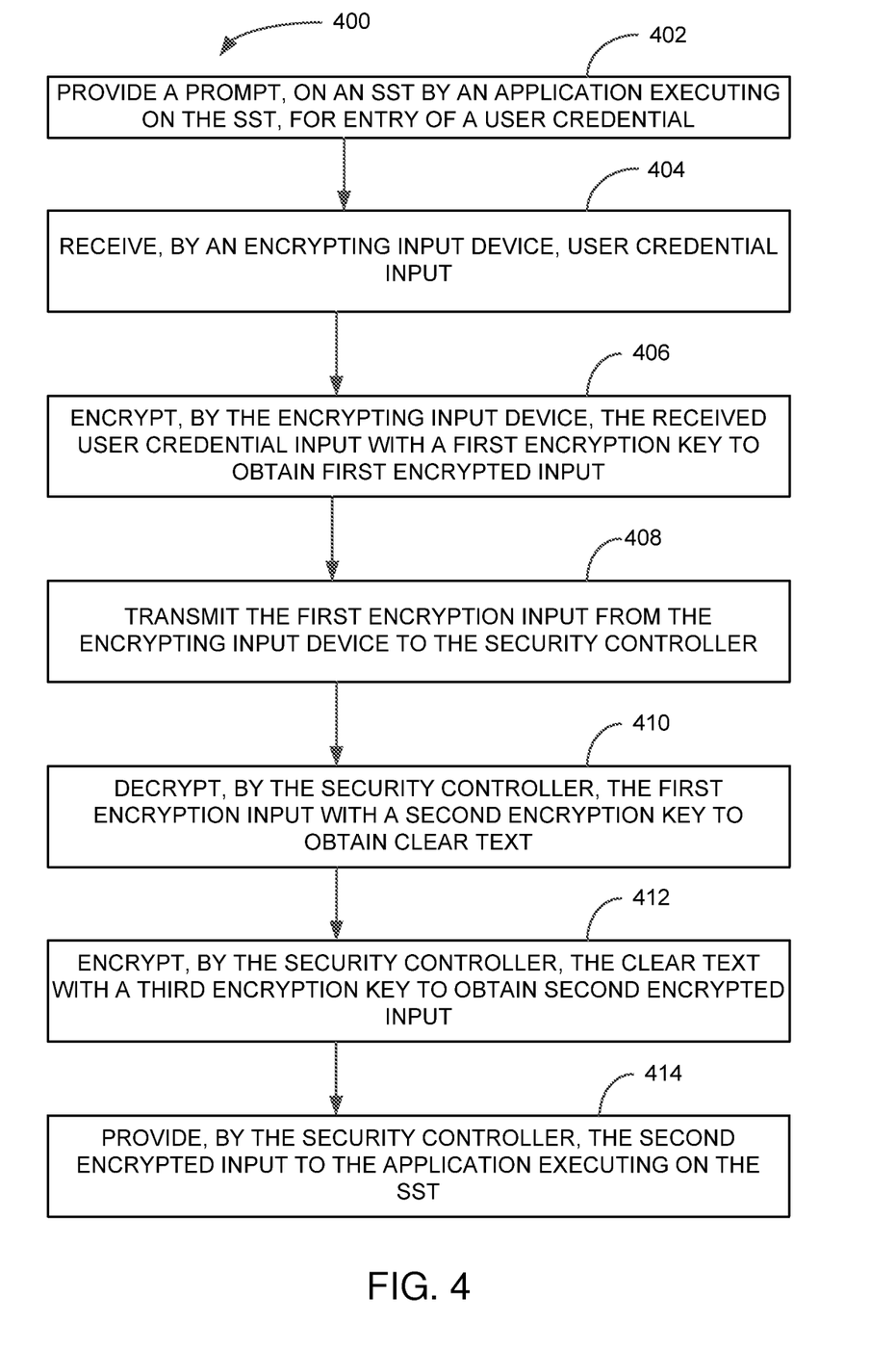
FIG. 4 is a block flow diagram of a method, according to an example embodiment.

FIG. 4 is a block flow diagram of a method 400, according to an example embodiment. The method 400 is an example embodiment of one method performed on an SST including a security controller, such as security controller 106 of FIG. 1 and FIG. 2 or a security controller included within a peripheral device, such as touch screen device 306 of FIG. 3.

The method 400 includes providing 402 a prompt, on a Self-Service Terminal (SST) by an application executing on the SST, for entry of a user credential. A prompt may be provided via a display device of the SST, such as a monitor, a touch screen, a monochromatic LCD display, or other display. The method 400 further includes receiving 404, by an encrypting input device, user credential input. The encrypting input device may be an encrypting PIN pad, encrypting touch screen, or other similar device. The user credential input may be a PIN number in some embodiments, but in other embodiments, the user credential input may include other or additional information, such as a ZIP code, phone number, a biometric input, a password, and other potentially sensitive or informative input. Upon receipt 404 of the user credential input, which may be signified or triggered by receipt of an ENTER command, the method 400 includes encrypting 406, by the encrypting input device, the received user credential input with a first encryption key to obtain first encrypted input. The first encryption key used by the encrypting input device is an encryption key of an encryption key pair established between the encrypting input device and a security controller of the SST. The encrypting input device then transmits 408 the first encryption input to the security controller.

The security controller, upon receipt, decrypts 410 the first encryption input with a second encryption key to obtain clear text. The second encryption key is an encryption key of the encryption key pair established between the encrypting input device and a security controller. The security controller then encrypts 412 the clear text with a third encryption key to obtain second encrypted input. The third encryption key is an encryption key of an encryption key pair established between the security controller and a host. The security controller then provides 414 the second encrypted input to the application executing on the SST.

Figure 5:
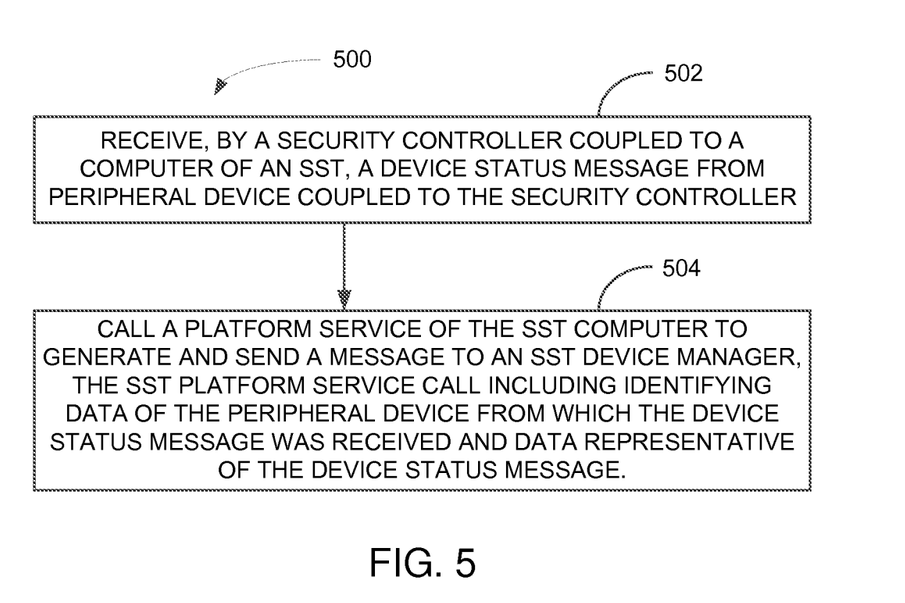
FIG. 5 is a block flow diagram of a method, according to an example embodiment.

FIG. 5 is a block flow diagram of a method 500, according to an example embodiment. The method 500 is an example of a method that may be performed by a security controller upon receipt of, and to process, a device management message from a peripheral device.

The method 500 includes a security controller coupled to an SST computer where the security controller receives 502 a device status message from a peripheral device coupled thereto. The security controller in such embodiments then calls 504 a platform service of the SST computer to generate a send a message to an SST device manager. In such embodiments, the SST platform service call 504 includes identifying data of the peripheral device from which the device status message was received 502. The SST platform service call 504 further includes data representative of the received 502 device status message. The received 502 device status message may include data representative of a peripheral device status, a detected tampering event, a device fault or error, or other event of device management interest that may occur.

Figure 6:
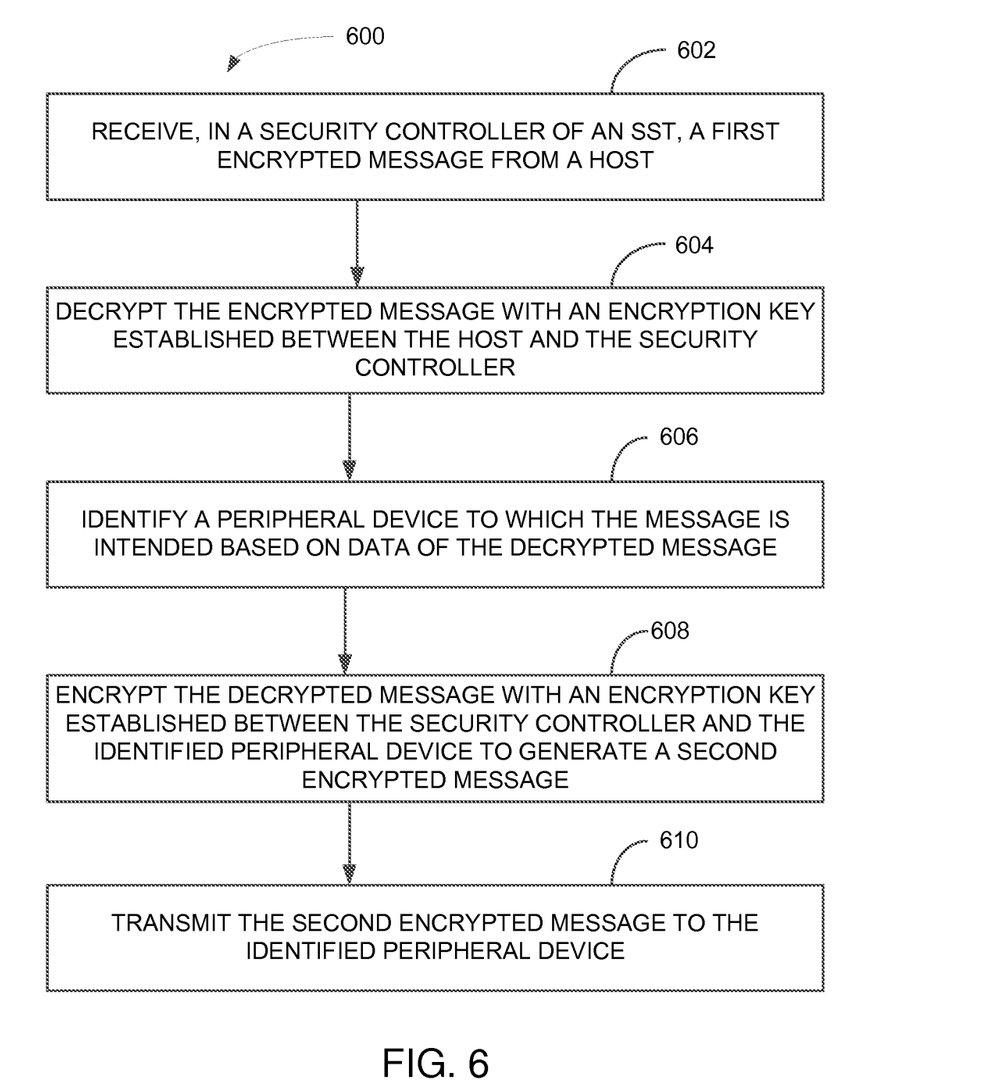
FIG. 6 is a block flow diagram of a method, according to an example embodiment.

FIG. 6 is a block flow diagram of a method 600, according to an example embodiment. The method 600 is an example embodiment of a method that may be performed by a security controller of an SST when receive a message from a host. The method 600 includes receiving 602, in the security controller, a first encrypted message from a host. The security controller then decrypts 604 the first encrypted message with an encryption key established between the host and the security controller. The security controller then processes the decrypted message to identify 606 a peripheral device to which the message is intended based on data of the decrypted message. For example, the decrypted message may include a dispense command. As dispense commands may only be handled by a currency dispenser, the security controller identifies 606 that the message is intended for a currency dispenser coupled thereto. Based on the identified 606 peripheral device, the security controller retrieves an encryption key established between the security controller and the identified peripheral device. The security controller then encrypts 608 the decrypted message with the retrieved key to generate a second encrypted message. The method 600 continues by transmitting 610 the second encrypted message to the identified 606 peripheral device.

Figure 7:
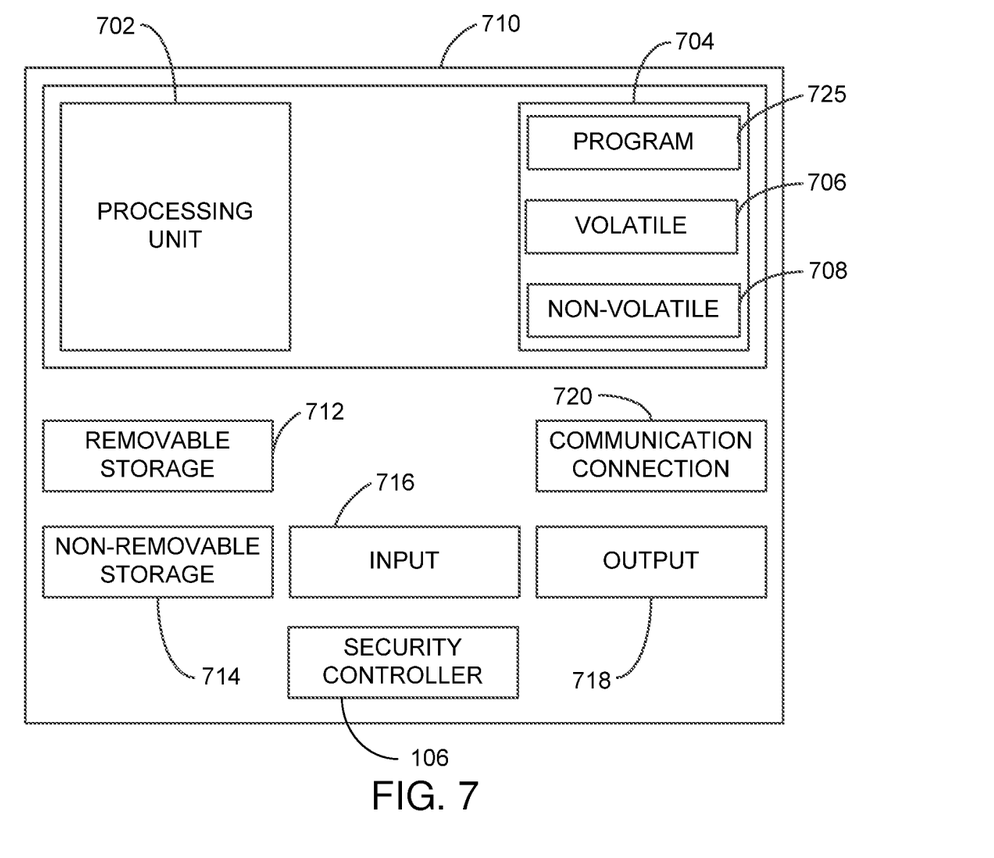
FIG. 7 is a block diagram of a computing device, according to an example embodiment.

FIG. 7 is a block diagram of a computing device, according to an example embodiment. In one embodiment, such a computing device is present within a SST to enable user interaction and host interaction. An object-oriented, service-oriented, or other architecture may be used to implement various functions and to communicate between multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 710 includes a security controller 106. Computer 710 may include or have access to a computing environment that includes input 716, output 718, and a communication connection 720. The input 716 may include one or more of a keyboard, a personal identification number (PIN) pad, a touch screen, a video camera, a biometric reading device, and the like. The output may include one or more of a receipt printer, a video monitor, one or more speakers, one or more headphone jacks to which another audio output device maybe coupled, a currency dispenser, tactile output, and other output devices depending on the particular embodiment. One or more of the input 716 and output 718 are connected to computer 710 via the security controller 106. For example, a PIN pad and touchscreen may be connected to the security controller in some embodiments. In some such embodiments, a cash dispenser is also connected to the security controller 106.

The computer operates in a networked environment using a communication connection to connect to one or more remote computers, such as host computer. The communication connection may include a Local Area Network (LAN), a Wide Area Network (WAN), a private, dedicated network, or other networks that provide sufficient security that may be needed or required by statute, regulation, other law, or policy.

Computer-readable instructions stored on a computer-readable medium are executable by the processing unit 702 of the computer 710. A hard drive, CD-ROM, and RAM are some examples of articles including a non-transitory computer-readable medium. For example, a computer program 725 capable of providing SST functionality or to perform at least a portion of one or more of the methods and processes described herein may be included on a CD-ROM or a portable hard drive and loaded therefrom to a local hard drive.

A further embodiment is in the form of a method. The method of this embodiment may be performed by a security controller coupled to an SST computer and having at least one peripheral device coupled thereto. The method of this embodiment includes decrypting a first encrypted input received from a peripheral device with a first encryption key to obtain clear text. The method further includes encrypting the clear text with a second encryption key to obtain second encrypted input, the second encryption key being a key of an encryption key pair established with a host. The second encrypted input may then be forwarded to the host either directly or via a platform service or a requesting process that executes on the SST computer.

Another embodiment is an SST. The SST in such embodiments contains a security controller device including a memory device and at least two peripheral device connections. In some embodiments, the security controller device operable to couple to the SST and interact with SST software, such as an operating system, platform services, and applications that execute on a computer of the SST. The security controller device in such embodiments is further operable to receive, via a peripheral device connection of the at least two peripheral device connections, a first encrypted input. The security controller may then decrypt the first encrypted input with a first encryption key stored in the memory device to obtain clear text. A second encryption key stored in the memory device may then be used to encrypt the clear text to obtain second encrypted input. The security controller device may be further operable to provide the second encrypted input to the SST software.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
decrypting, by a security controller of a dedicated peripheral device interconnect device that is physically distinct from a computer controlling operation, is communicatively coupled to the computer controlling operation of a Self-Service Terminal (SST), and to which at least two peripheral devices are directly coupled, the dedicated peripheral device interconnect device physically positioned between each of the at least two peripheral devices and the computer controlling operation of the SST, a first encrypted input received from a peripheral device with a first encryption key to obtain clear text, the dedicated peripheral device interconnect device embedded within a peripheral device and operable to provide security services to an SST when coupled thereto; and
encrypting, by the security controller of the peripheral device interconnect device, the clear text with a second encryption key to obtain second encrypted input, the second encryption key being a key of an encryption key pair established with a transaction processing host.

2. The method of claim 1, further comprising:
receiving a device status message from the peripheral device, the peripheral device being one of two or more peripheral devices coupled to the security controller performing the method;
calling a platform service of the SST to which the security controller is coupled to cause the SST to generate and send a message to an SST device manager, the SST platform service call including identifying data of the peripheral device from which the device status message was received and data representative of the device status message.

3. The method of claim 1, further comprising:
storing, in a memory of the peripheral device, a third encryption key, the third encryption key being an encryption key of an encryption key pair established between the peripheral device and the security controller to which the peripheral device is coupled;
receiving input into the peripheral device;
encrypting, with the third encryption key, the received input to obtain the first encrypted input; and
transmitting the first encrypted input to the security controller.

4. The method of claim 3, wherein the method is triggered for execution upon the peripheral device receiving an input ENTER command.

5. The method of claim 1, wherein the method is performed by the security controller of the SST and the peripheral device is an encrypting Personal Identification Number (PIN) pad device.

6. The method of claim 5, wherein the security controller is integrated within an encrypting touch screen device.

7. The method of claim 5, wherein the SST is an Automated Teller Machine (ATM).

8. A method comprising:
providing a prompt, on a Self-Service Terminal (SST) by an application executing on the SST, for entry of a user credential;
receiving, by an encrypting input device, user credential input;
encrypting, by the encrypting input device, the received user credential input with a first encryption key to obtain first encrypted input, the first encryption key being an encryption key of an encryption key pair established between the encrypting input device and a security controller, wherein the security controller is embedded within another peripheral device that is a dedicated device that provides security services to an SST when coupled thereto, the dedicated peripheral device interconnect device is physically distinct from a computer controlling operation of the SST and physically positioned between the encrypting input device and the computer controlling operation of the SST;
transmitting the first encryption input from the encrypting input device to the security controller;
decrypting, by the security controller, the first encryption input with a second encryption key to obtain clear text, the second encryption key being an encryption key of the encryption key pair established between the encrypting input device and the security controller;
encrypting, by the security controller, the clear text with a third encryption key to obtain second encrypted input, the third encryption key being an encryption key of an encryption key pair established between the security controller and a transaction processing host; and
providing, by the security controller, the second encrypted input to the application executing on the SST.

9. The method of claim 8, further comprising:
detecting a fault condition on the encrypting input device;
transmitting a device status message including data representative of the fault condition from the encrypting input device to the security controller;
calling, by the security controller in response to receiving the device status message, an SST platform service to cause the SST to generate and send a message to an SST device manager, the SST platform service call including encrypting input device identifying data and data representative of the device status message.

10. The method of claim 8, wherein the encrypting input device is one of at least two encrypting input devices.

11. The method of claim 10, wherein the at least two encrypting input devices consist of an encrypting Personal Identification Number (PIN) pad device and an encrypting touch screen device.

12. The method of claim 10, wherein:
the security controller is integrated within a first encrypting input device of the at least two encrypting input devices;
the first encrypting input device is coupled to another component of the SST; and
the other of the at least two encrypting input devices are coupled to the first encrypting input device.

13. The method of claim 8, further comprising:
receiving, in the security controller, an encrypted message from the transaction processing host;
decrypting the encrypted message with the third encryption key;

determining the decrypted message is a currency dispenser command for a dispenser device coupled to the security controller;

encrypting the decrypted message with a fourth encryption key to obtain an encrypted dispense command, the fourth encryption key being an encryption key of an encryption key pair established between the security controller and the dispenser device; and transmitting the encrypted dispense command to the dispenser device.

14. The method of claim 8, further comprising:

detecting a tampering event in the security controller; and erasing all encryption keys from the security controller.

15. A Self-Service Terminal (SST) comprising:

a security controller device including a memory device and at least two peripheral device connections, the security controller device embedded within a dedicated peripheral device that is physically distinct from a computer controlling operation of the SST and provides security services to the SST when coupled thereto, the dedicated peripheral device physically positioned between each of the at least two peripheral devices and the computer controlling operation of the SST, the security controller device operable to:

couple to the SST and interact with SST software;

receive, via a peripheral device connection of the at least two peripheral device connections, a first encrypted input;

decrypt the first encrypted input with a first encryption key stored in the memory device to obtain clear text, the first encryption key being an encryption key of an asynchronous encryption key pair established between the security controller and a peripheral device from which the first encrypted input was received; and encrypt the clear text with a second encryption key stored in the memory device to obtain second encrypted input, the second encryption key being a key of an asynchronous encryption key pair established between the security controller and a transaction processing host.

16. The SST of claim 15, wherein the security controller device is further operable to provide the second encrypted input to the SST software.

17. The SST of claim 15, wherein the memory device is a volatile memory and includes a battery that provides power to the memory device to maintain keys stored in the memory device when the SST is cycled.

18. The SST of claim 16, further comprising:

a peripheral device connected to one of the at least two peripheral device connections of the security controller, the peripheral device including:

a memory storing a third encryption key, the third encryption key being an encryption key of an asynchronous encryption key pair established between the peripheral device and the security controller;

an input receiving device; and an encryption module to receive input from the input receiving device, encrypt received input to obtain the first encrypted input, and transmit the first encrypted input to the security controller device.

19. The SST of claim 18, wherein the SST is an Automated Teller Machine (ATM) and the input receiving device is a Personal Identification Number (PIN) input device.

20. The SST of claim 19, wherein the PIN input device is an encrypting touch screen device.

* * * * *